United States Patent
Heidrich et al.

(10) Patent No.: US 10,995,539 B2
(45) Date of Patent: *May 4, 2021

(54) CLUTCH MECHANISM BETWEEN LEADSCREW AND ELECTRIC MOTOR

(71) Applicant: Westinghouse Air Brake Technologies Corporation, Wilmerding, PA (US)

(72) Inventors: Peter Heidrich, Des Plaines, IL (US); Peter M. Giannis, Arlington Heights, IL (US)

(73) Assignee: WESTINGHOUSE AIR BRAKE TECHNOLOGIES CORPORATION, Wilmerding, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/866,099

(22) Filed: May 4, 2020

(65) Prior Publication Data
US 2020/0263480 A1 Aug. 20, 2020

Related U.S. Application Data

(62) Division of application No. 15/521,684, filed as application No. PCT/US2015/057348 on Oct. 26, 2015, now Pat. No. 10,683,692.

(Continued)

(51) Int. Cl.
*E05F 15/657* (2015.01)
*E05F 15/652* (2015.01)
(Continued)

(52) U.S. Cl.
CPC .......... *E05F 15/657* (2015.01); *E05F 15/603* (2015.01); *E05F 15/652* (2015.01); *F16D 11/14* (2013.01); *F16D 23/12* (2013.01); *F16H 1/20* (2013.01); *F16H 25/20* (2013.01); *E05Y 2201/214* (2013.01); *E05Y 2201/216* (2013.01); *E05Y 2201/246* (2013.01); *E05Y 2201/462* (2013.01); *E05Y 2201/626* (2013.01); *E05Y 2201/636* (2013.01); *E05Y 2201/68* (2013.01); *E05Y 2201/716* (2013.01); *E05Y 2800/11* (2013.01); *E05Y 2900/51* (2013.01); *F16D 2023/123* (2013.01); *F16H 2025/2071* (2013.01)

(58) Field of Classification Search
CPC ..... E05F 15/603; E05F 15/652; E05F 15/657; F16H 25/02; F16H 2025/2071; F16H 1/20; F16H 25/20; F16D 11/10; F16D 11/14; F16D 23/12; E05Y 2201/214; E05Y 2201/216; E05Y 2201/246; E05Y 2201/462; E05Y 2201/626; E05Y 2201/636; E05Y 2201/68; E05Y 2201/716; E05Y 2800/11; E05Y 2900/51
See application file for complete search history.

(56) References Cited

U.S. PATENT DOCUMENTS

| | | | | |
|---|---|---|---|---|
| 3,740,146 A | * | 6/1973 | Wilharm | G03B 19/26 352/91 C |
| 6,334,276 B1 | * | 1/2002 | Marin-Martinod | B64C 1/1407 49/139 |
| 10,683,692 B2 | * | 6/2020 | Heidrich | E05F 15/603 |

* cited by examiner

*Primary Examiner* — Richard M Lorence
(74) *Attorney, Agent, or Firm* — Christopher R. Carroll; The Small Patent Law Group LLC

(57) ABSTRACT

A clutch mechanism for coupling and uncoupling an electric motor and leadscrew has dog-clutch gears that can be engaged by a linear actuator, bell crank, and linkage shaft. Uncoupling force due to narrowed dog teeth are resisted by the alignment of the linkage shaft with the central portion of the bell crank.

18 Claims, 5 Drawing Sheets

Related U.S. Application Data

(60) Provisional application No. 62/069,953, filed on Oct. 29, 2014.

(51) Int. Cl.
*E05F 15/603* (2015.01)
*F16D 11/14* (2006.01)
*F16D 23/12* (2006.01)
*F16H 1/20* (2006.01)
*F16H 25/20* (2006.01)

CLUTCH MECHANISM BETWEEN LEADSCREW AND ELECTRIC MOTOR

CROSS-REFERENCE TO RELATED APPLICATIONS

This application is a divisional of U.S. patent application Ser. No. 15/521,684, filed 25 Apr. 2017, which is a national stage entry of PCT Application No. PCT/US2015/057348, filed 26 Oct. 2015 pursuant to 35 U.S.C. § 371, which claims the benefit of U.S. Provisional Application No. 62/069,953, filed 29 Oct. 2014. The entire disclosures of these applications are incorporated herein by reference.

BACKGROUND

Technical Field

The subject matter described herein is directed to a clutch mechanism between a leadscrew and an electric motor for driving the leadscrew. It is particularly useful for enabling the manual opening of sliding plug doors on a public transit vehicle, such as a passenger bus. Such sliding doors are driven to open and close by alternate rotation of the leadscrew.

Description of Art

Sliding plug doors for transit vehicles are described in detail in U.S. Pat. No. 6,032,416 entitled "Transit Vehicle Door" assigned to the same assignee as the present invention.

As can be understood from the above-referenced prior art patent, outside sliding plug doors on a transit vehicle are actuated by use of an electric motor coupled to a leadscrew and nut drive usually through a gearbox. The leadscrew and nut drive a door carriage mounted on a linear slide. The disadvantage of this system is that when the doors need to be opened manually, such as in an emergency, the motor and gearbox are not decoupled from the leadscrew. Therefore, the door or doors can only be back driven while forcing turning of the leadscrew. This requires a strong manually applied force.

It is an advantage according to the inventive subject matter to provide a clutching mechanism inserted between the output of the electric motor and gearbox and the leadscrew facilitating the emergency manual opening of the sliding doors.

BRIEF SUMMARY

Briefly according to the inventive subject matter, a clutch mechanism between the rotatable output shaft of an electric motor fixed to a base and a leadscrew rotatably journaled to the base comprises a leadscrew gear, a drive gear mounted to rotate with the output shaft of the electric motor, axially slidable dog-clutch gear directly or indirectly driving the leadscrew, said axially slidable dog-clutch gear having a plurality of dog teeth axially extending away from the leadscrew and circumferentially spaced on the face of the axially slidable dog-clutch gear, said face being perpendicular to the rotating axis of the gear, said axially slidable dog-clutch gear having gear teeth on the circumference for engaging the gear teeth on the leadscrew gear, a axially fixed dog-clutch gear for engaging or disengaging the slidable dog-clutch gear, said fixed dog-clutch gear having a plurality of dog teeth axially extending toward the leadscrew and circumferentially spaced on the face of the fixed dog-clutch gear, said face being perpendicular to the rotating axis of the gear, said fixed dog-clutch having gear teeth on the circumference for engaging the gear teeth on the drive gear, a bell crank being rotatably mounted to the base, said bell crank having extensions in at least two radial directions, a linear actuator having a shaft extending from a first end thereof, said linear actuator being pivotally mounted to the base at the other end, said linear actuator having a biasing means for extending the shaft when not powered, the shaft of the linear actuator being pivotally connected to an extension of the bell crank, and a linkage shaft pivotally connected at one end to an extension of the bell crank and connected via a universal joint connection at the other end to the slidable dog-clutch. When the linear actuator is unpowered, the linkage shaft due to the biasing means in the linear actuator forces the disengagement of dog teeth on the dog-clutch gears enabling the emergency manual opening of the sliding doors.

Preferably, the dog teeth on the dog-clutch gears have planar contact faces that taper radially toward the axis and also in the direction of the axis, the dog teeth thus narrowing moving away from the face of the dog-clutch gears to facilitate disengagement.

Preferably, the linkage shaft and the linear actuator shaft are pivotally connected to the bell crank angularly spaced more than 90 degrees and less than 180 degrees such that at one stop position when the dog-gears are coupled, the axis of the linkage shaft passes centrally through the bell crank, and in a second position when the dog-gears are uncoupled, the axis of the linkage shaft pass through an outer edge of the bell crank.

BRIEF DESCRIPTION OF THE DRAWINGS

Further features and other objects and advantages will become clear from the following detailed description made with references to the drawings in which.

DETAILED DESCRIPTION

Figure 1:
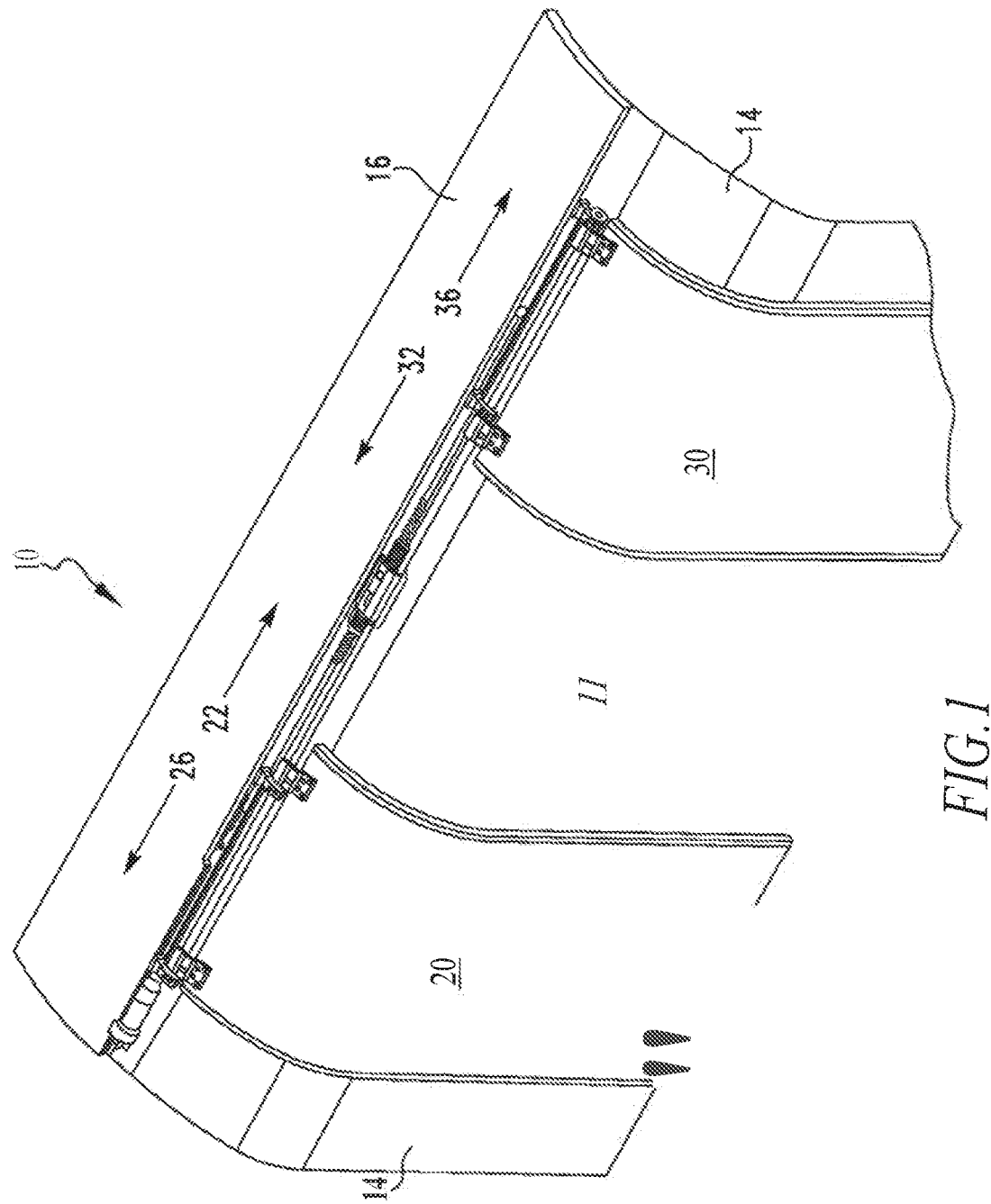
FIG. 1 shows a pair of bi-parting doors in a wall of a transit vehicle according to the prior art with a direct connection between the electric motor and the leadscrew.

FIG. 1 shows, by way of background, a transit vehicle door system 10 for covering and uncovering an aperture 12 for ingress and egress of passengers in a wall 14 of a transit vehicle 16. The door system 10 has a first door 20 mounted for movement in a first door closing direction 22 to a first door closed position at least partially covering aperture 12 and for movement in a first door opening direction 26 to a first door open position at least partially uncovering aperture 12, the first door opening direction 26 being opposite to the first door closing direction 22.

Figure 2:
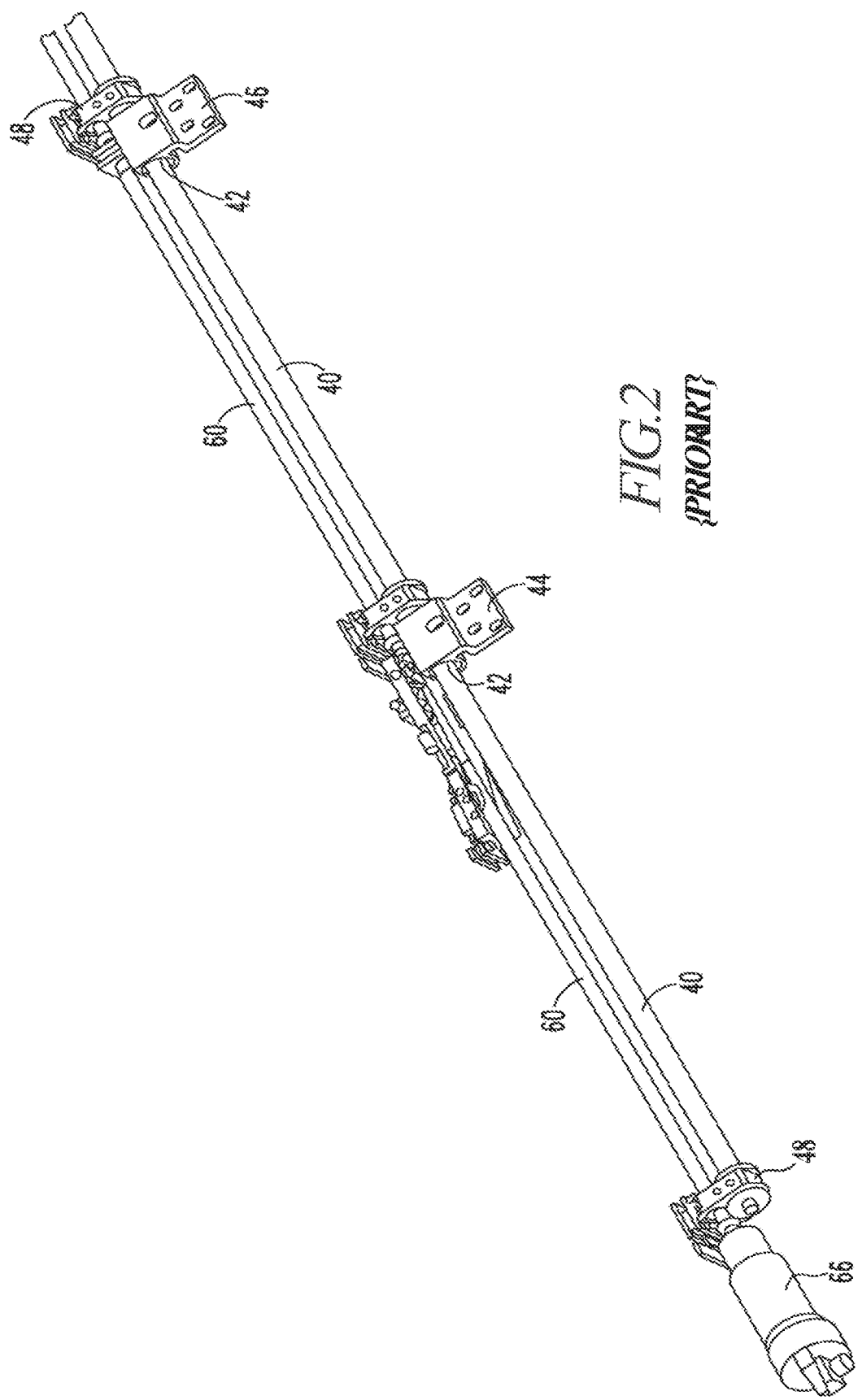
FIG. 2 shows, for a single door, a motor, leadscrew, support rod and hangers, door hangers and lock assembly according to the prior art with a direct connection between the electric motor and the leadscrew.

FIGS. 1 and 2, by way of background, show door 20 suspended from a rod 40 by sliding connections 42 on a first door outer hanger 44 and a first door inner hanger 46, rod 40 being oriented about in a longitudinal direction of the transit vehicle 16. Rod 40 is suspended from a rod hanger 48. Contacting surfaces of rod 40 and sliding connections 42 of door hangers 44 and 46 should be smooth and preferably include low friction materials.

Door system 10 also has a second door 30 connected to a drive leadscrew 60 for longitudinal movement opposite to the first door 20, the second door 30 moving in a second door closing direction 32 to a second door closed position at least partially covering aperture 12 when first door 20 moves in the first door closing direction 22, and second door 30 moving in a second door opening direction 36 to a second door open position at least partially uncovering aperture 12 when first door 20 moves in the first door opening direction 26. The second door closing direction 32 is generally opposite to the first door closing direction 22 and the second door opening direction 36 is generally opposite to the first door opening direction 26. Hence, the first door 20 and the second door 30 cooperate to cover and uncover the aperture 12, as shown in FIGS. 1 and 2. A leadscrew 60 includes a nut assembly (not shown) for the first door 20 and a nut assembly (not shown) for the second door 30. The nut assemblies turning on the leadscrew interconnect with the respective doors to carry the doors to the open or closed positions depending on the rotation direction of the leadscrew driven by an electric motor 66.

Figure 3:
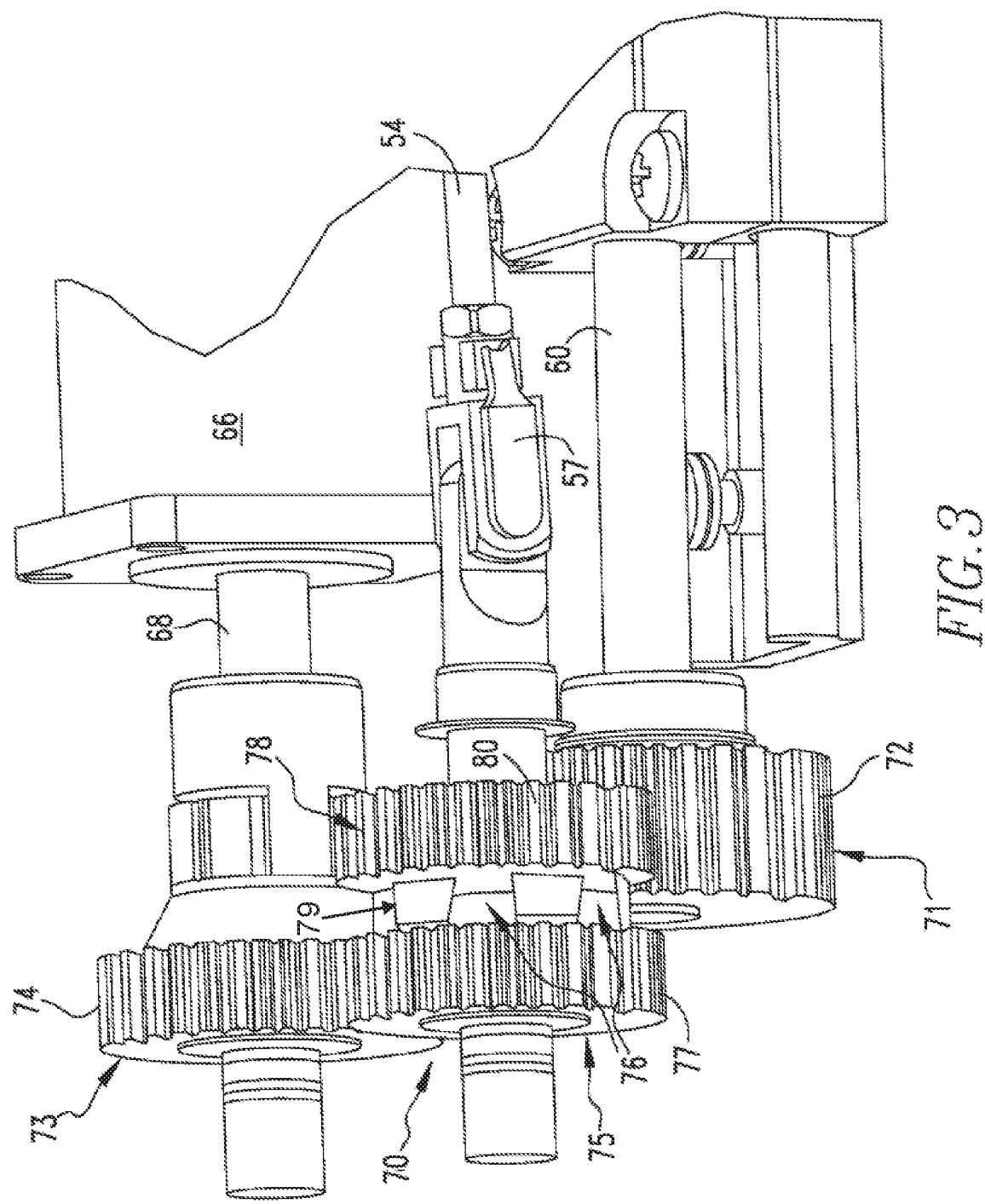
FIG. 3 is a perspective view of gears comprising the clutch mechanism between the leadscrew and electric motor according to the inventive subject matter.

Referring now to FIG. 3, a clutch mechanism 70 is positioned between a rotatable output shaft 68 of the electric motor 66 fixed to a base and the leadscrew 60 rotatably journaled to the base. The base is either the vehicle wall 14 or a structure fixed relative to the vehicle wall.

A leadscrew gear 71 has a plurality of wide gear teeth 72 spaced on the circumference. The leadscrew gear is mounted to rotate with the leadscrew.

A drive gear 73 has a plurality of gear teeth 74 spaced on the circumference, said drive gear mounted to rotate with the output shaft 68 of the electric motor 66.

An axially fixed dog-clutch gear 75 directly or indirectly drives the leadscrew. The fixed dog-clutch gear 75 has a plurality of dog teeth 76 axially extending away from and circumferentially spaced on the face of the fixed dog-clutch gear. The face is perpendicular to the rotating axis of the gear. The fixed dog-clutch gear 75 has gear teeth 77 on the circumference for engaging the gear teeth 74 on the drive gear 73.

An axially sliding dog-clutch gear 78 is secured axially slidable relative to the base for engaging or disengaging the fixed dog-clutch gear 75. The slidable dog-clutch gear 78 has a plurality of dog teeth 79 axially extending and circumferentially spaced on the face of the slidable dog-clutch gear. The face is perpendicular to the rotating axis of the gear. The slidable dog-clutch 78 has gear teeth 80 on the circumference for engaging the wide gear teeth 72 on the lead screw gear 71.

The sliding dog-clutch gear 78 and the fixed dog-clutch gear 75 are attached to a sliding shaft and fixed axle, respectively. They rotate due to bearings affixed between them and the shaft or axle.

Figure 4:
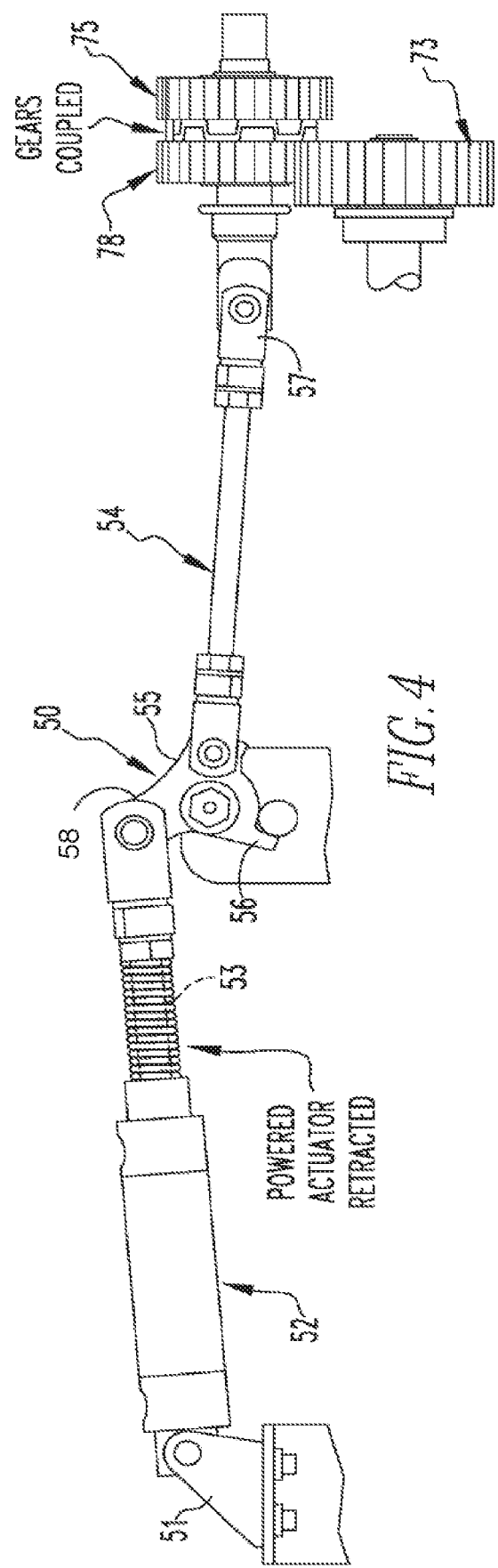
FIG. 4 is a view showing the entire clutch mechanism according to the inventive subject matter including the linear actuator, bell crank, and linkage shaft in the coupled position.
Figure 5:
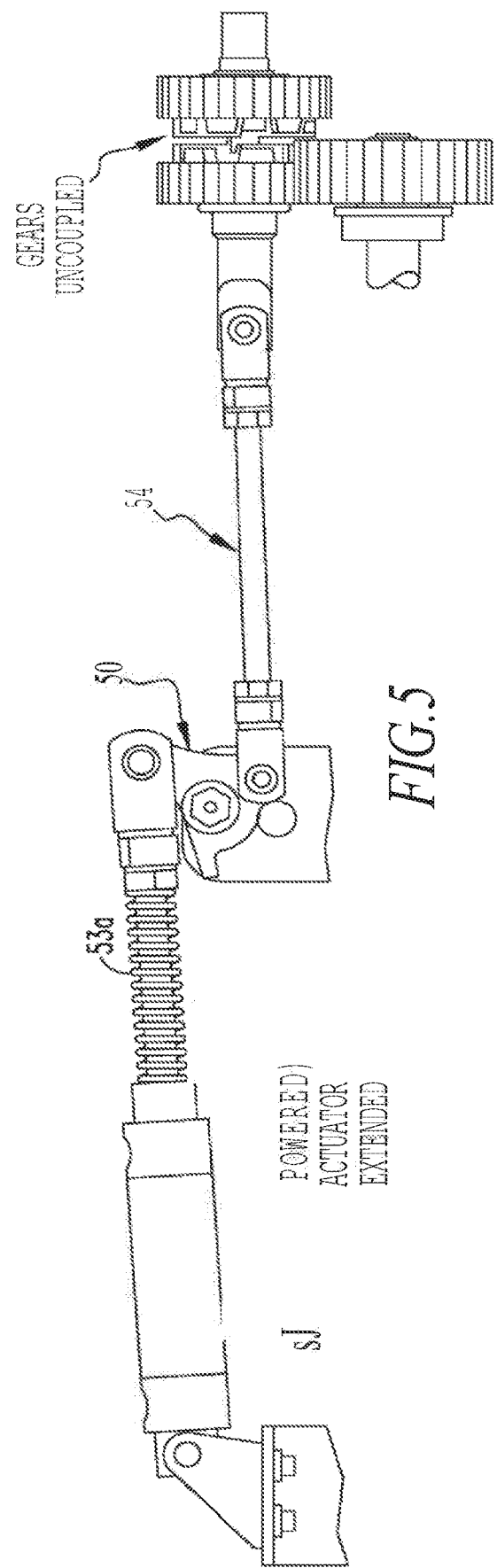
FIG. 5 is a view showing the entire clutch mechanism according to the inventive subject matter in the uncoupled position.

Referring now to FIGS. 4 and 5, a bell crank 50 is rotatably mounted to the base. The bell crank has extensions in at least two radial directions. A linear actuator 52 has a shaft 53 extending from a first end of the actuator. The linear actuator 52 is pivotally mounted at an extension 51 to the base at the other end. The linear actuator 52 has a biasing means, for example, a coil spring 53 $a$, for extending the shaft 53 out of the actuator when not powered. The actuator shaft 53 is pivotally connected to an extension 58 of the bell crank 50. The actuator 52 may be powered, for example, by an electrical solenoid. When the actuator is unpowered, the biasing means extends shaft 53.

A linkage shaft 54 is pivotally connected at one end to an extension 55 of the bell crank 50 and connected via a universal joint 57 at the other end to the second dog-clutch gear 78. Thus, when the linear actuator is unpowered, the linkage shaft 54 due to the biasing means in the linear actuator extends the shaft 53 and rotates the bell crank 50 withdrawing the linkage shaft 54 forcing the disengagement of dog teeth on the first dog-clutch gear 75 and the second dog-clutch gear 78 enabling the manual opening of the door.

According to one embodiment, the dog teeth on the dog-clutch gears have planar contact faces that taper radially toward the axis and also in the direction of the axis. The dog teeth thus narrow moving away from the face of the dog-clutch gears to facilitate disengagement. However, as the dog teeth on both dog-clutch gears meet on a plane inclined to the direction of motion, there exists a small axial force urging separation of the dog-clutch gears.

According to another embodiment, the linkage shaft 54 and the linear actuator shaft 53 are pivotally connected to the bell crank 50 angularly spaced more than 90 degrees and less than 180 degrees about the axis of the bell crank 50 such that at one stop position as shown in FIG. 4 when the dog-gears are coupled, the axis of the linkage shaft 54 passes centrally through the bell crank 50. In a second position when the dog-gears are uncoupled, as shown in FIG. 5, the axis of the linkage shaft 54 passes near an outer edge of the bell crank 50. The bell crank has a third extension 56 engaging a stop fixed to the base when the bell crank 50 has rotated to the coupled position.

In the coupled position, an uncoupling force transmitted through the linkage shaft 54 thus can apply a very small, if any, moment force to rotate the bell crank 50. On the other hand, in the coupled position, the moment force exerted though the actuator shaft 53 to resist uncoupling is maximum.

Having thus described our invention with the detail and particularity required by the Patent Laws, what is desired protected by Letters Patent is set forth in the following claims.

What is claimed is:

1. A clutch mechanism comprising:
   a drive gear mounted on an output shaft of a motor;
   a first gear having first radial gear teeth that radially extend from the first gear and that are shaped to mesh with the drive gear, the first gear having first axial gear teeth that axially extend from the first gear;
   a drive leadscrew connected to a door of a door system, the drive leadscrew including a leadscrew gear;
   a second gear having second radial gear teeth that radially extend from the second gear and that are shaped to mesh with the leadscrew gear of the door system, the second gear having second axial gear teeth that axially extend from the second gear; and
   a bell crank coupled with the second gear and configured to rotate around a first rotation axis, the bell crank configured to rotate to axially move the second gear toward or away from the first gear,
   wherein the second gear is configured to axially move toward the first gear to engage the second axial gear teeth with the first axial gear teeth such that the leadscrew gear of the door system is rotated by the drive gear via the first and second gears, wherein the second gear is configured to axially move away from the first gear to disengage the second axial gear teeth from the first axial gear teeth such that the leadscrew gear of the door system is not rotated by the drive gear via the first and second gears.

2. The clutch mechanism of claim 1, wherein the first gear is configured to be rotated around a second rotation axis by rotation of the drive gear around a different, third rotation axis by the motor, the second gear is configured to be rotated around the second rotation axis by rotation of the first gear while the first axial gear teeth of the first gear are engaged with the second axial gear teeth of the second gear.

3. The clutch mechanism of claim 1, wherein the second gear is configured to axially move toward and away from the first gear while the second radial gear teeth of the second gear remain engaged with the leadscrew gear of the door system.

4. The clutch mechanism of claim 1, wherein the bell crank is coupled with a spring to bias the bell crank toward an angular position that axially moves the second gear away from the first gear.

5. The clutch mechanism of claim 1, wherein the first gear is fixed in position such that the first gear does not axially move toward or away from the second gear.

6. The clutch mechanism of claim 1, wherein the first axial gear teeth of the first gear and the second axial gear teeth of the second gear taper inward toward an axis that the first gear and the second gear rotate around.

7. A clutch mechanism for a door system, the clutch mechanism comprising:
   a drive gear mounted on an output shaft of a motor;
   a first dog tooth gear having first radial gear teeth that radially extend from the first dog tooth gear and that are shaped to mesh with the drive gear, the first dog tooth gear having first dog gear teeth;
   a drive leadscrew connected to a door of the door system, the drive leadscrew including a leadscrew gear;
   a second dog tooth gear having second radial gear teeth that radially extend from the second dog tooth gear and that are shaped to mesh with the leadscrew gear of the door system, the second dog tooth gear having second dog gear teeth; and
   a bell crank coupled with the second dog tooth gear and configured to rotate to axially move the second dog tooth gear,
   wherein the second dog tooth gear is configured to axially move toward the first dog tooth gear to engage the second dog gear teeth with the first dog gear teeth such that the leadscrew gear of the door system is rotated by the drive gear via the first and second dog tooth gears.

8. The clutch mechanism of claim 7, wherein the second dog tooth gear is configured to axially move away from the first dog tooth gear to disengage the second dog gear teeth from the first dog gear teeth such that the leadscrew gear of the door system is not rotated by the drive gear via the first and second dog tooth gears.

9. The clutch mechanism of claim 7, wherein the first dog tooth gear is configured to be rotated around a first rotation axis by rotation of the drive gear around a different, second rotation axis by a motor.

10. The clutch mechanism of claim 9, wherein the second dog tooth gear is configured to be rotated around the first rotation axis by rotation of the first dog tooth gear and to rotate the leadscrew gear around a different, third rotation axis.

11. The clutch mechanism of claim 7, wherein the second dog tooth gear is configured to axially move toward and away from the first dog tooth gear while remaining engaged with the leadscrew gear of the door system.

12. The clutch mechanism of claim 7, wherein the bell crank is coupled with a spring to bias the bell crank toward an angular position that axially moves the second dog tooth gear away from the first dog tooth gear.

13. The clutch mechanism of claim 7, wherein the first dog tooth gear is fixed in position such that the first dog tooth gear does not axially move toward or away from the second dog tooth gear.

14. The clutch mechanism of claim 7, wherein the first dog gear teeth and the second dog gear teeth taper inward toward an axis that the first dog tooth gear and the second dog tooth gear rotate around.

15. A clutch mechanism comprising:
   a drive gear;
   a first gear having first radial gear teeth that radially extend from the first gear and that are shaped to mesh with the drive gear, the first gear having first axial gear teeth that axially extend from the first gear;
   a drive leadscrew connected to a door, the drive leadscrew including a leadscrew gear;
   a second gear having second radial gear teeth that radially extend from the second gear and that are shaped to mesh with the leadscrew gear, the second gear having second axial gear teeth that axially extend from the second gear; and
   a bell crank coupled with the second gear and configured to rotate around a first rotation axis, the bell crank configured to rotate to axially move the second gear toward or away from the first gear,
   wherein the second gear is configured to axially move toward the first gear to engage the second axial gear teeth with the first axial gear teeth such that the leadscrew gear of the door system is rotated by the drive gear via the first and second gears,
   wherein the second gear is configured to axially move away from the first gear to disengage the second axial gear teeth from the first axial gear teeth such that the leadscrew gear of the door system is not rotated by the drive gear via the first and second gears,
   wherein the second gear is configured to axially move toward and away from the first gear while the second radial gear teeth of the second gear remain engaged with the leadscrew gear of the door system.

16. The clutch mechanism of claim 15, wherein the first gear is configured to be rotated around a second rotation axis by rotation of the drive gear around a different, third rotation axis, the second gear is configured to be rotated around the second rotation axis by rotation of the first gear while the first axial gear teeth of the first gear are engaged with the second axial gear teeth of the second gear.

17. The clutch mechanism of claim 15, wherein the bell crank is coupled with a spring to bias the bell crank toward an angular position that axially moves the second gear away from the first gear.

18. The clutch mechanism of claim 15, wherein the first gear is fixed in position such that the first gear does not axially move toward or away from the second gear.

* * * * *